US005946148A

United States Patent [19]

Fischer

[11] Patent Number: 5,946,148

[45] Date of Patent: Aug. 31, 1999

[54] VARIABLE TRANSMISSION BEAMSPLITTER

[75] Inventor: George L. Fischer, Hackettstown, N.J.

[73] Assignee: The United States of America as represented by the Secretary of the Air Force, Washington, D.C.

[21] Appl. No.: 09/184,464

[22] Filed: Oct. 26, 1998

[51] Int. Cl.[6] .......... G02B 5/04

[52] U.S. Cl. .......... 359/831; 359/833

[58] Field of Search .......... 359/589, 583, 359/638, 831, 833, 834, 832, 629, 487, 578, 579

[56] References Cited

U.S. PATENT DOCUMENTS

| | | | |
|---|---|---|---|
| 2,809,570 | 10/1957 | Dearing et al. | 359/589 |
| 2,815,695 | 12/1957 | Scharf et al. | 359/583 |
| 2,960,015 | 11/1960 | Rodine | 359/888 |
| 4,796,997 | 1/1989 | Svetkoff et al. | 356/376 |
| 4,931,636 | 6/1990 | Huggins | 250/226 |
| 5,272,518 | 12/1993 | Vincent | 356/405 |

*Primary Examiner*—Cassandra Spyrou
*Assistant Examiner*—Euncha Cherry
*Attorney, Agent, or Firm*—Stanton E. Collier

[57] ABSTRACT

The present invention consists of two right angle prisms, one of which is coated with a wedged layer of low index of refraction transparent material such as magnesium fluoride. The coating varies in thickness, linearly, for example, from about 50 to 700 nanometers, for example. The prisms are cemented together forming a rectangular cube beamsplitter. The beamsplitter is then mounted onto a stage so that the plane of the cemented surfaces is parallel to the axis of translation. As one translates the cube along its axis, the ratio of reflectance to transmittance varies according to the thickness or other factors.

7 Claims, 1 Drawing Sheet

VARIABLE TRANSMISSION BEAMSPLITTER

CROSS-REFERENCES TO RELATED PATENT APPLICATIONS

None

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

The present invention relates to optical devices, and, in particular, relates to means for controlling the transmission of light.

DESCRIPTION OF RELATED ART

In controlling the path of laser radiation, the use of mirrors and beamsplitters is common practice. Beamsplitters may be flat plates or cubes and are constructed to have a given ratio of reflectance to transmittance with a uniform thickness of material. Normally, to change this ratio a new beamsplitter is required. After replacement, alignment of the apparatus is usually necessary.

Thus, there exists a need for a means of easily adjusting this ratio.

BRIEF SUMMARY OF THE INVENTION

The present invention consists of two right angle prisms, one of which is coated with a wedged layer of low-index-of-refraction transparent material such as magnesium fluoride. The coating varies in thickness, linearly, for example, from about 50 to 700 nanometers, for example. The prisms are cemented together forming a rectangular cube beamsplitter. The beamsplitter is then mounted onto a stage so that the plane of the cemented surfaces is parallel to the axis of translation. As one translates the cube along its axis, the ratio of reflectance to transmittance varies according to the thickness or other factors.

Therefore, one object of the present invention is to provide a means for changing the amount of light in a beam without altering the apparatus setup.

Another object of the present invention is to provide a beamsplitter with a variable transmission feature.

Another object of the present invention is to provide a beamsplitter with a variable transmission feature mounted to a mechanical/electro-mechanical stage for use in an optical apparatus.

Another object of the present invention is to provide a beamsplitter with a variable transmission feature wherein said variable transmission feature is predetermined.

Another object of the present invention is to provide a beamsplitter with a variable transmission feature that is monotonic along an axis of movement.

Another object of the present invention is to provide a beamsplitter with a single layer of material to vary transmission, having no delamination, lower absorption, and lower scattering losses.

These and many other objects and advantages of the present invention will be ready apparent to one skilled in the pertinent art from the following detailed description of a preferred embodiment of the invention and the related drawings.

BRIEF DESCRIPTION OF THE SEVERAL VIEWS OF THE DRAWINGS

The only FIGURE illustrates a schematic view of the present invention.

DETAILED DESCRIPTION OF THE INVENTION

Figure 1:
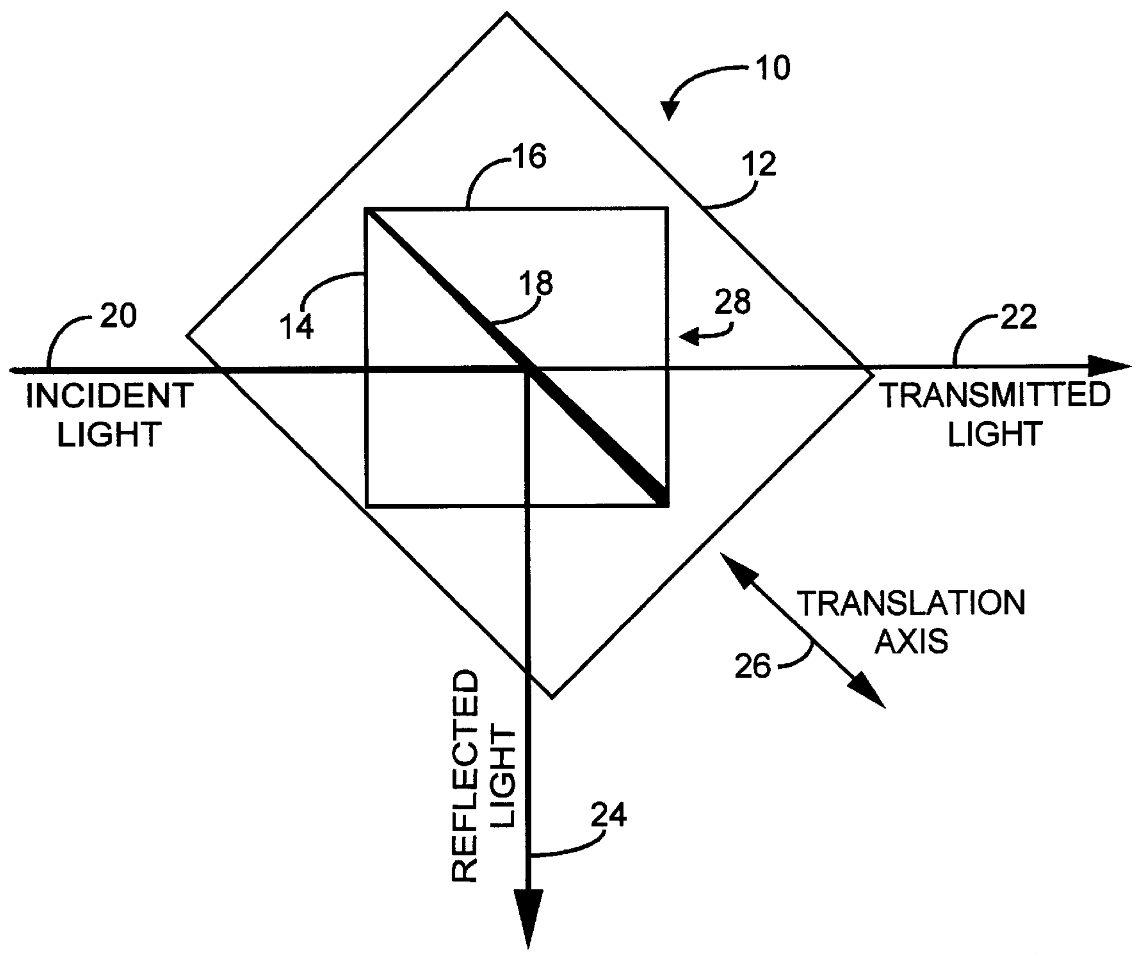

Referring to the only FIGURE, an adjustable beamsplitter 10 is shown. A cube beamsplitter 28 is mounted to a stage 12. A first prism 14 and a second prism 16 have a wedge of material 18 mounted therebetween. The stage 12 translates along an axis 26 parallel to the wedge 18. In operation, an incident light beam 20 having a diameter smaller than the face of the first prism enters the cube 28 and intersects the wedge 18 at a preselected position which determines the ratio of reflection to transmittance. A transmitted beam 22 and a reflected beam 24 result therefrom. In order to change this ratio, the stage 12 is translated along the axis 26 to change the point of intersection between the Igiht beam 20 and the wedge 18.

The one of the two right angle prisms, 14 or 16, is coated with a wedged layer of low index of refraction transparent material known in the art. This material may be magnesium fluoride. The coating varies in thickness from about approximately 50 to 700 nanometers in a linear manner, but this may be altered. The prisms are cemented together forming a cube beamsplitter 28. The beamsplitter 28 is then mounted on a stage so that the plane of the cemented surfaces is parallel to the axis 26 of translation.

The cube beamsplitter 28 is constructed of two right angle prisms. These prisms are thoroughly cleaned and then the hypotenuse side is coated in a conventional manner to provide a wedge-like coating with a predetermined thickness. After the prism has been coated, this surface is bonded to the hypotenuse of the other prism with optical quality cement to form a cube beamsplitter.

As depicted in FIG. 1, the beamsplitter is then mounted to a translation stage that is aligned to move along the plane of the of the cemented surfaces. The incident monochromatic light beam is normal to the prism face. To increase the transmitted fraction of light, the stage is translated so that the light impinges on a smaller low index of refraction gap. To decrease the transmitted fraction of light, the stage is translated in the other direction so that the light impinges on a larger gap. The beam paths of the light are unchanged for all of the beams so there are no realignment issues for most applications.

Clearly many modifications and variations of the present invention are possible in light of the above teachings and it is therefore understood, that within the inventive scope of the inventive concept, that the invention may be practiced otherwise than specifically claimed.

What is claimed is:

1. A device for changing the ratio of reflectance to transmittance in a beamsplitter, said device comprising:

means for moving said beamsplitter;

said beamsplitter, said beamsplitter having means therein to change said ratio in a preselected manner as determined by said means for moving said beamsplitter, said means comprising a wedge-shaped layer of low index of refraction material.

2. A device as defined in claim 1 wherein said means for moving said beamsplitter is a stage having at least one axis of translation in a direction parallel to said layer.

3. A device as defined in claim 1 wherein said beamsplitter comprises a first prism, said wedge-shaped layer deposited on said first prism, and a second prism bonded to said wedge-shaped layer and said first prism to form a cube-shaped beamsplitter.

4. A device as defined in claim 3 wherein said wedge-shaped layer varies linearly in thickness.

5. A device as defined in claim 4 wherein said wedge-shaped layer varies in thickness from about 50 to about 700 nanometers.

6. A device as defined in claim 1 wherein said layer is magnesium fluoride.

7. A method of changing the ratio of reflectance to transmittance in a beamsplitter, said method comprising the steps of:

mounting a cube-shaped beamsplitter to a stage wherein a wedge-shape layer of low index of refraction material is essentially parallel to one translation axis of said stage; and moving the stage to position said cube-shaped beamsplitter in a predetermined position to adjust the ratio to a preselected ratio thereat wherein an incident beam is both transmitted and reflected in said preselected ratio, Whereby the ratio is changed without realignment in an optical device.

* * * * *